No. 848,503. PATENTED MAR. 26, 1907.
C. SEYMOUR.
MACHINE FOR MAKING COMPRESSED BUNGS.
APPLICATION FILED OCT. 18, 1905.
10 SHEETS—SHEET 1.

WITNESSES:
Edward Thorpe.
Theo. G. Hoster

INVENTOR
Charles Seymour
BY
Munn
ATTORNEYS

No. 848,503. PATENTED MAR. 26, 1907.
C. SEYMOUR.
MACHINE FOR MAKING COMPRESSED BUNGS.
APPLICATION FILED OCT. 18, 1905.
10 SHEETS—SHEET 4.

WITNESSES:
Edward Thorpe

INVENTOR
Charles Seymour
BY
ATTORNEYS

No. 848,503. PATENTED MAR. 26, 1907.
C. SEYMOUR.
MACHINE FOR MAKING COMPRESSED BUNGS.
APPLICATION FILED OCT. 18, 1905.
10 SHEETS—SHEET 6.
Fig. 6.
Fig. 7.
Fig. 8.
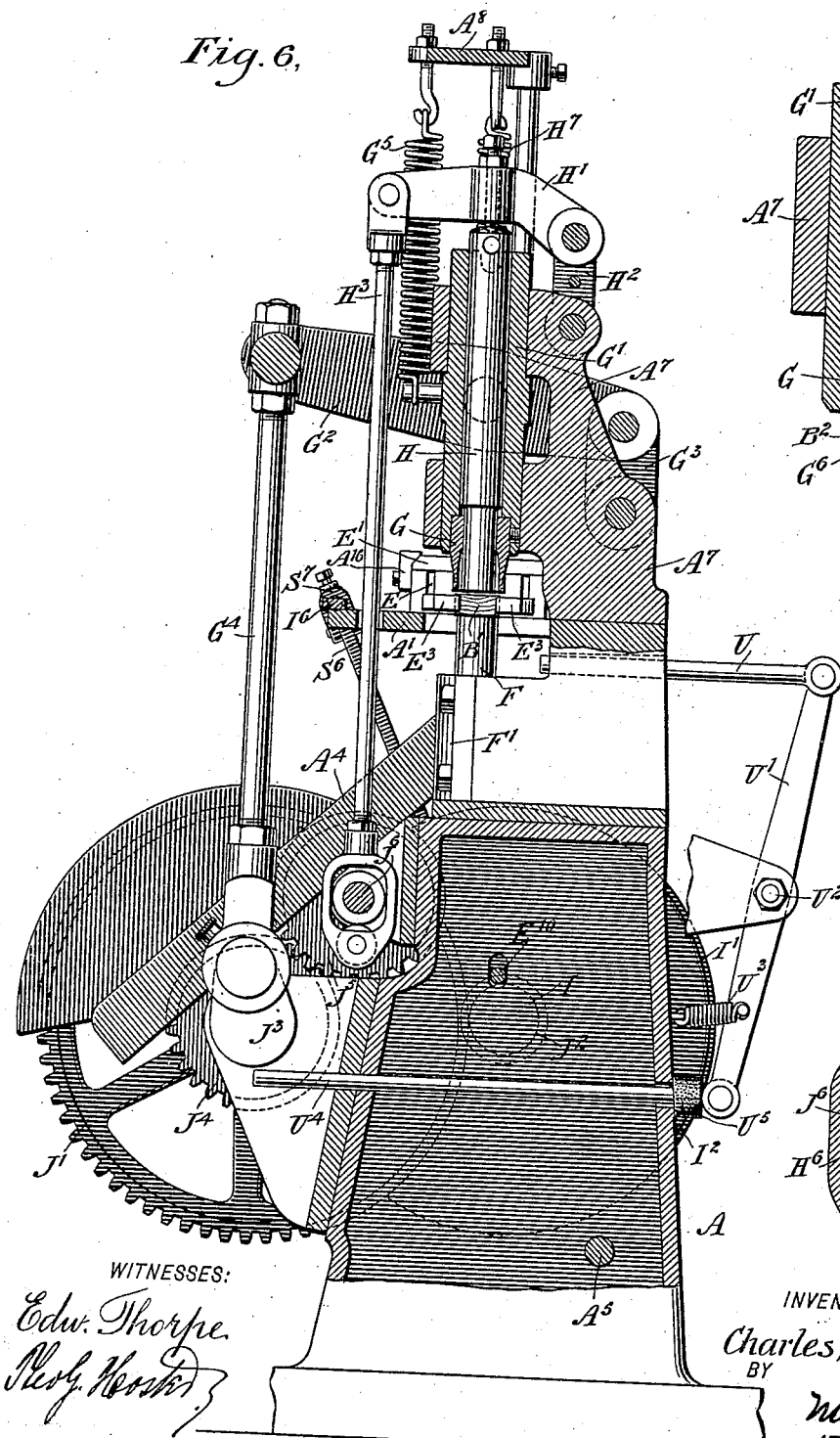
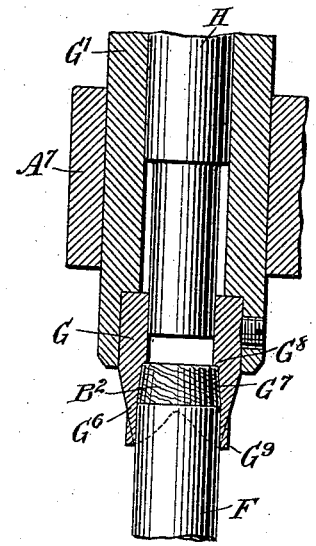
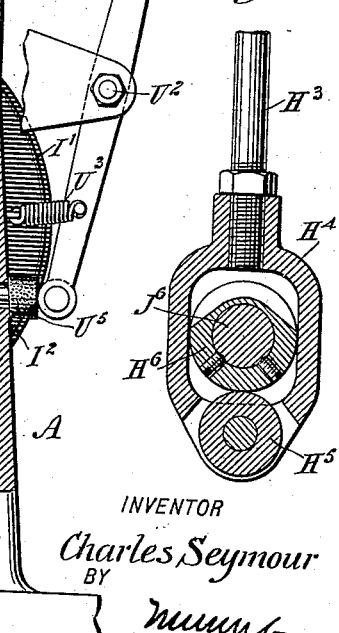
WITNESSES:
Edw. Thorpe
INVENTOR
Charles Seymour
BY
ATTORNEYS

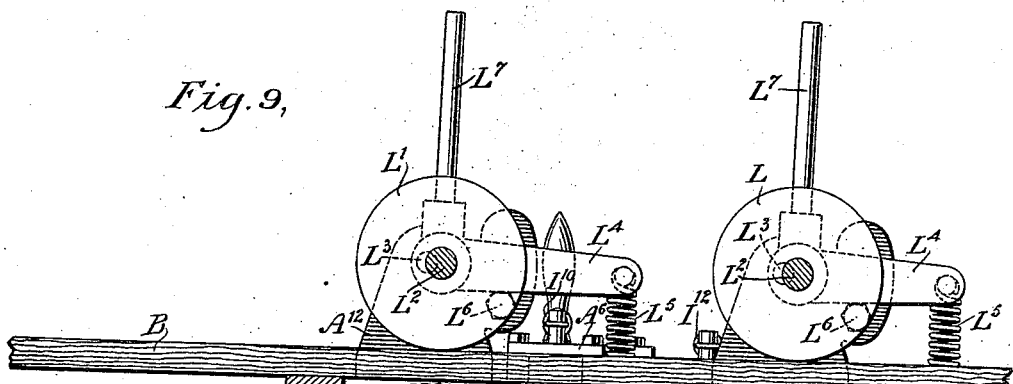
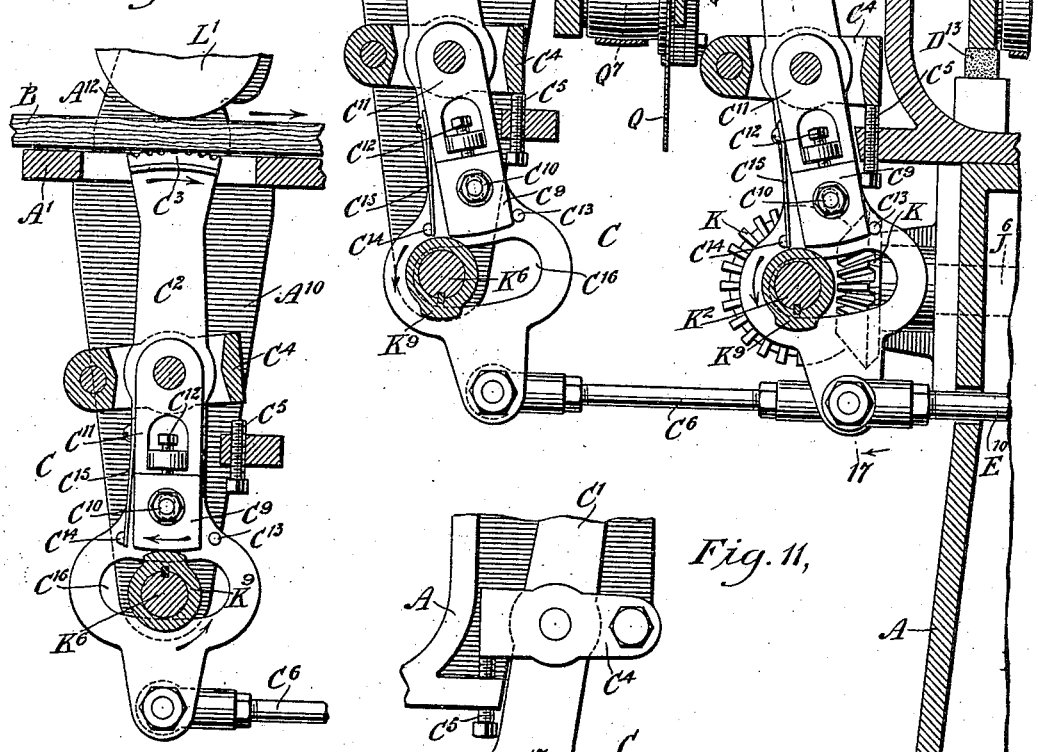
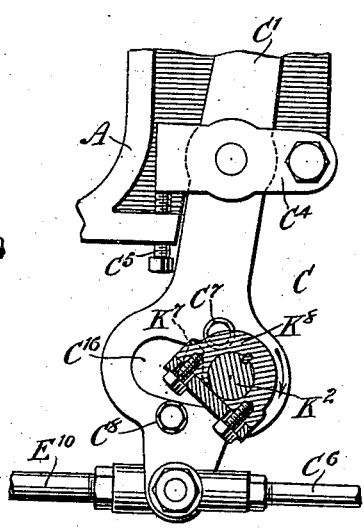

No. 848,503. PATENTED MAR. 26, 1907.
C. SEYMOUR.
MACHINE FOR MAKING COMPRESSED BUNGS.
APPLICATION FILED OCT. 18, 1905.
10 SHEETS—SHEET 8.
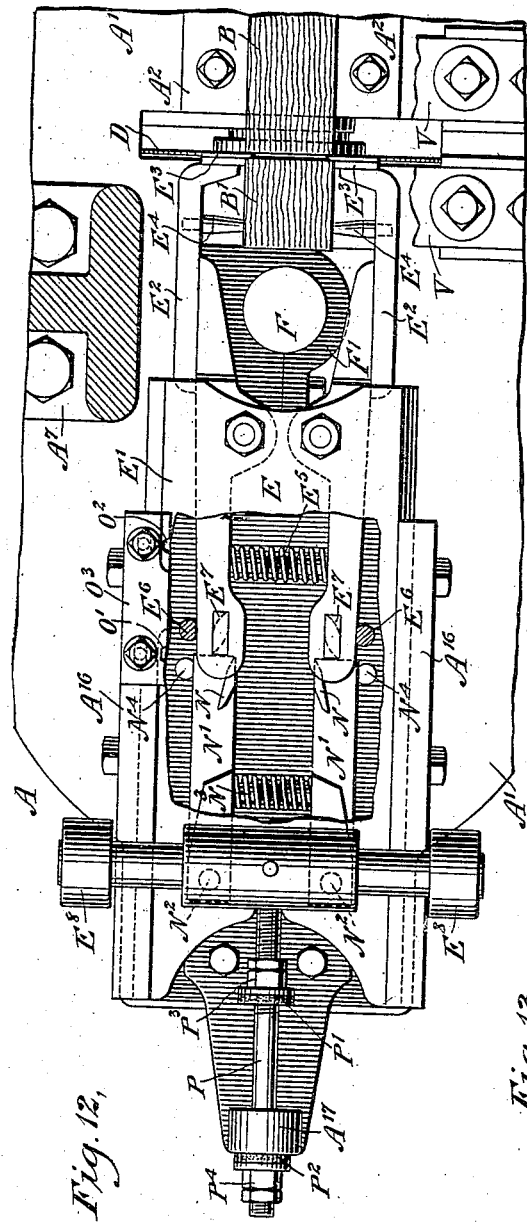
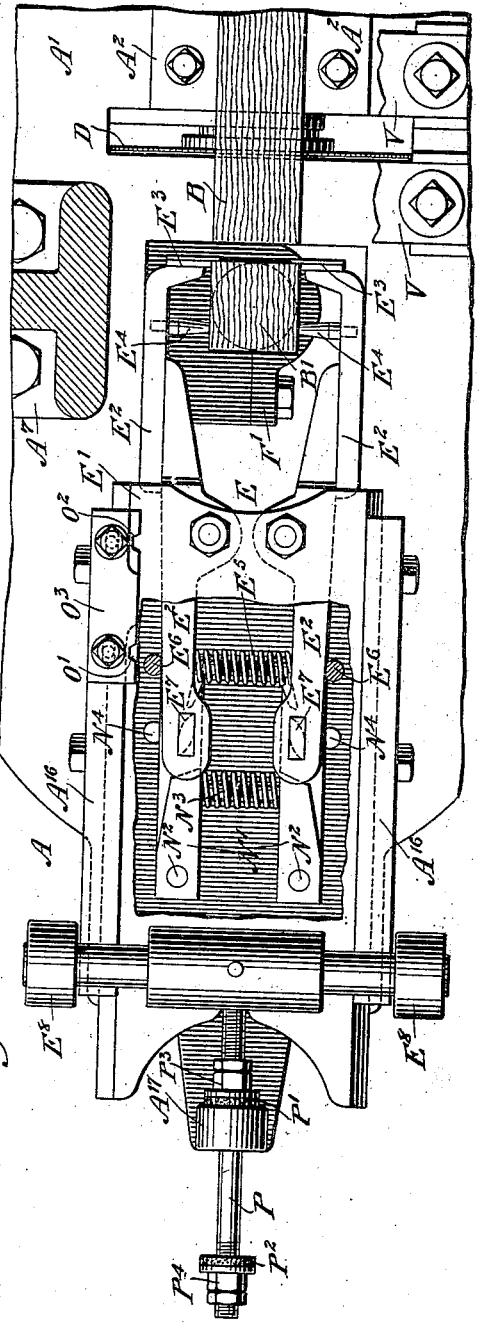
WITNESSES:
Edward Thorpe,
INVENTOR
Charles Seymour
BY
ATTORNEYS No. 848,503. PATENTED MAR. 26, 1907.
C. SEYMOUR.
MACHINE FOR MAKING COMPRESSED BUNGS.
APPLICATION FILED OCT. 18, 1905.
10 SHEETS—SHEET 9.
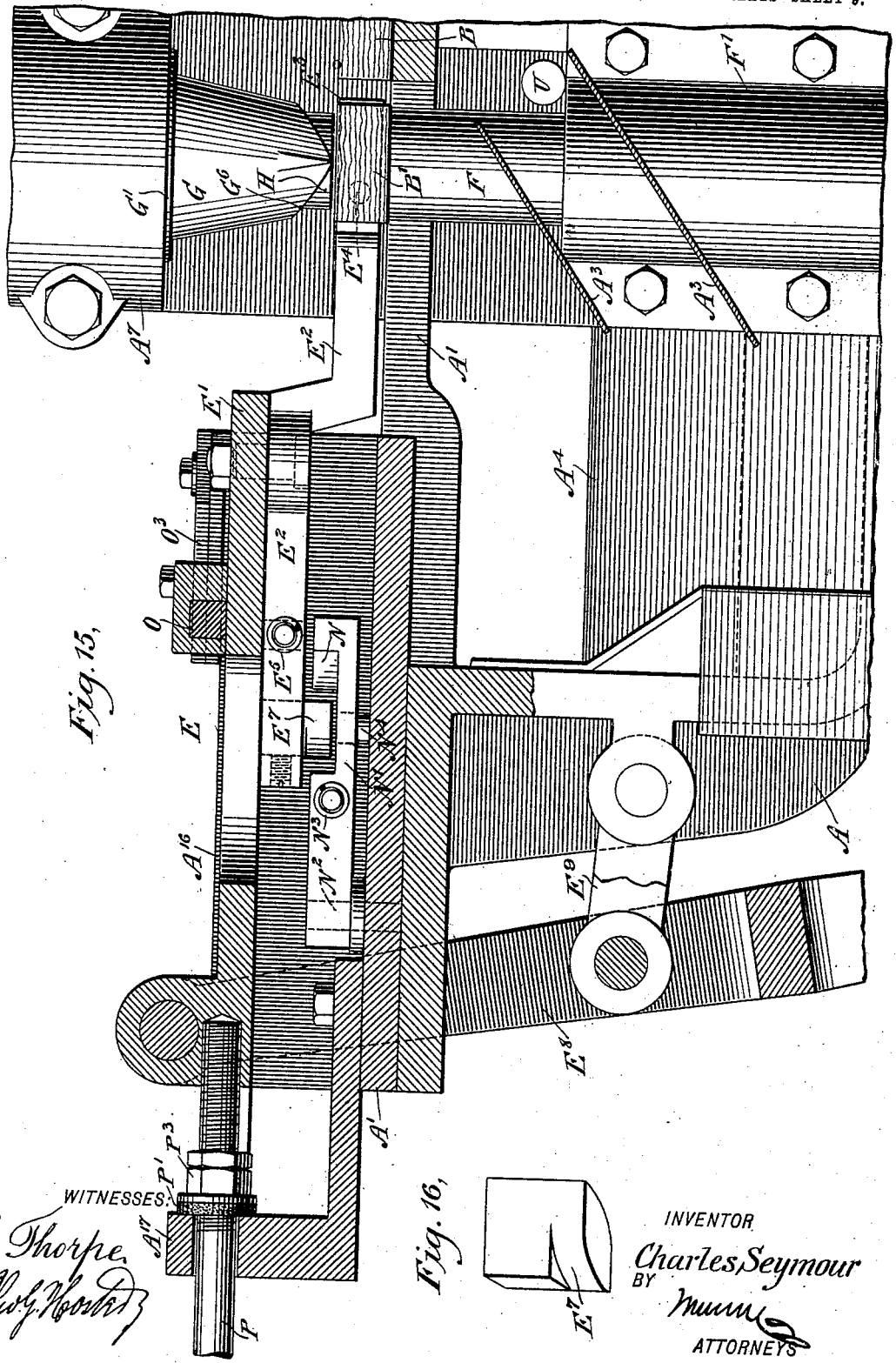
WITNESSES
E. Thorpe
INVENTOR
Charles Seymour
BY
ATTORNEYS No. 848,503. PATENTED MAR. 26, 1907.
C. SEYMOUR.
MACHINE FOR MAKING COMPRESSED BUNGS.
APPLICATION FILED OCT. 18, 1905.

10 SHEETS—SHEET 10.

WITNESSES:
Edward Thorpe.

INVENTOR
Charles Seymour
BY
ATTORNEYS

UNITED STATES PATENT OFFICE.

CHARLES SEYMOUR, OF DEFIANCE, OHIO, ASSIGNOR TO THE DEFIANCE MACHINE WORKS, OF DEFIANCE, OHIO.

MACHINE FOR MAKING COMPRESSED BUNGS.

No. 848,503.     Specification of Letters Patent.     Patented March 26, 1907.

Application filed October 18, 1905. Serial No. 283,270.

*To all whom it may concern:*

Be it known that I, CHARLES SEYMOUR, a citizen of the United States, and a resident of Defiance, in the county of Defiance and State of Ohio, have invented a new and Improved Machine for Making Compressed Bungs, of which the following is a full, clear, and exact description.

The invention relates to woodworking machinery; and its object is to provide a new and improved machine for making compressed bungs from a flat stick of wood and arranged to insure a complete automatic action for feeding the stick intermittently the desired distance for cutting off a square blank from the stick for the formation of the bung, for trimming the square blank to form a cylindrical blank and to compress the same into a bung of truncated-cone shape, and for stopping the machine when the end of the stick of wood is reached.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 1:
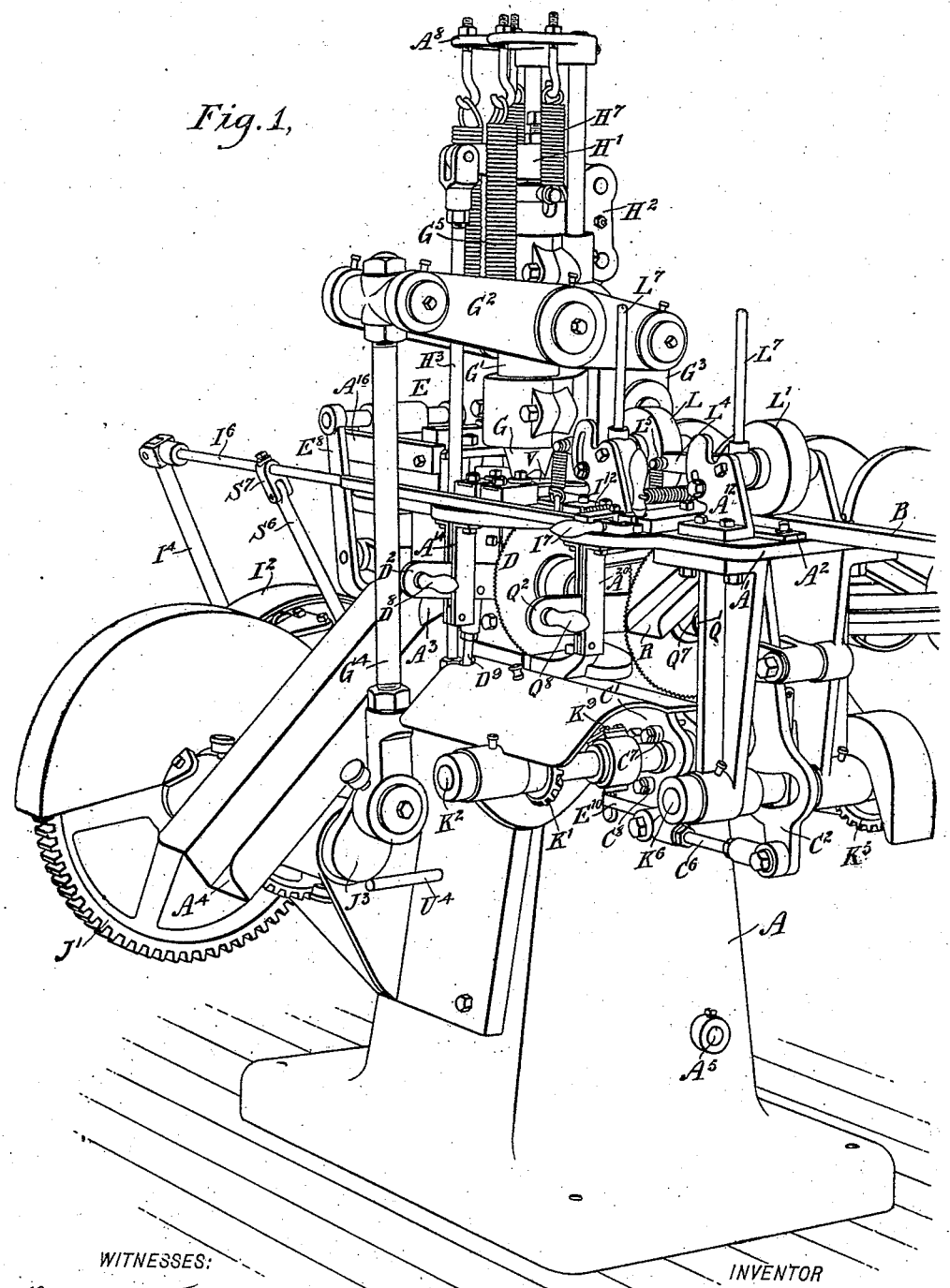
Figure 2:
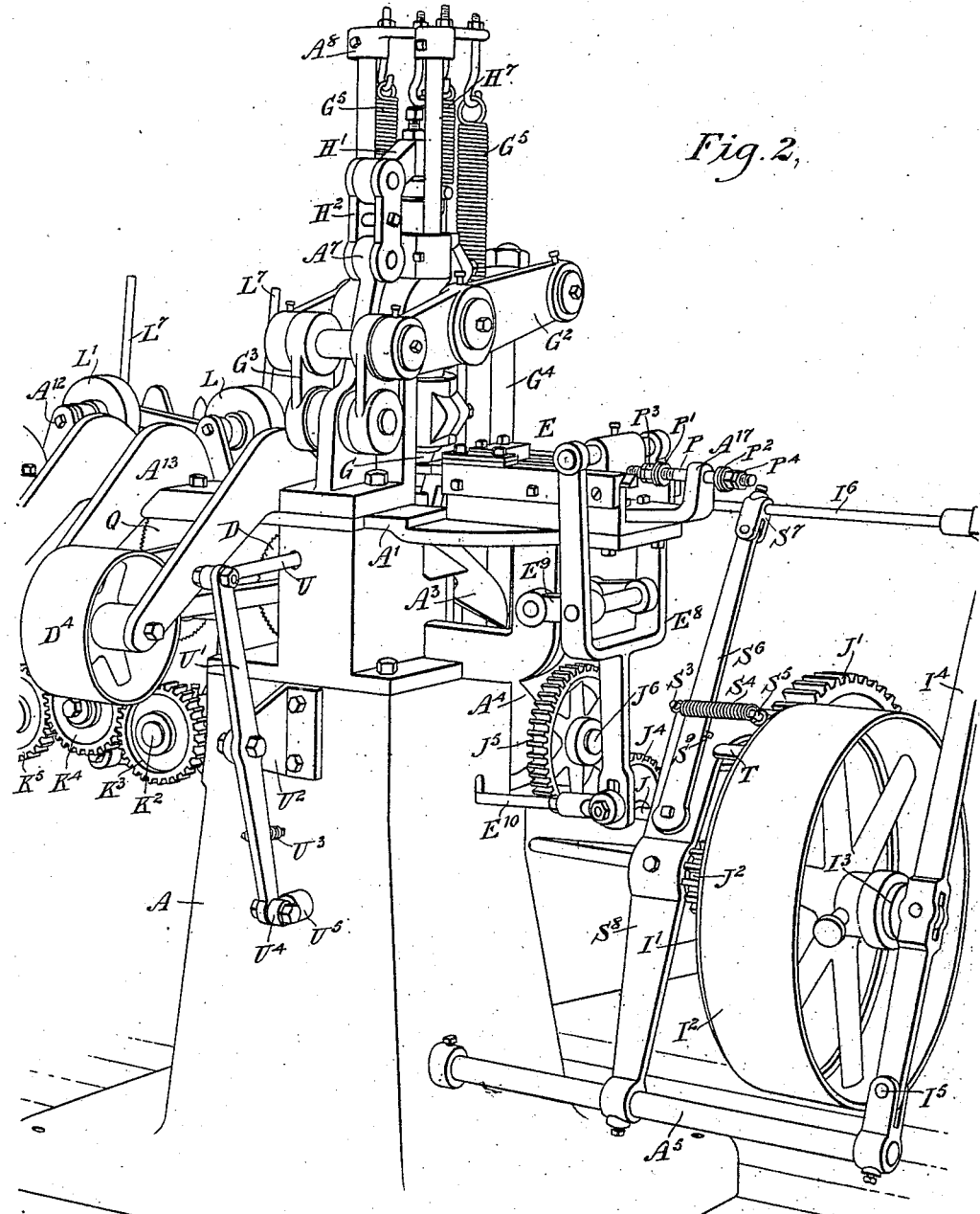
Figure 3:
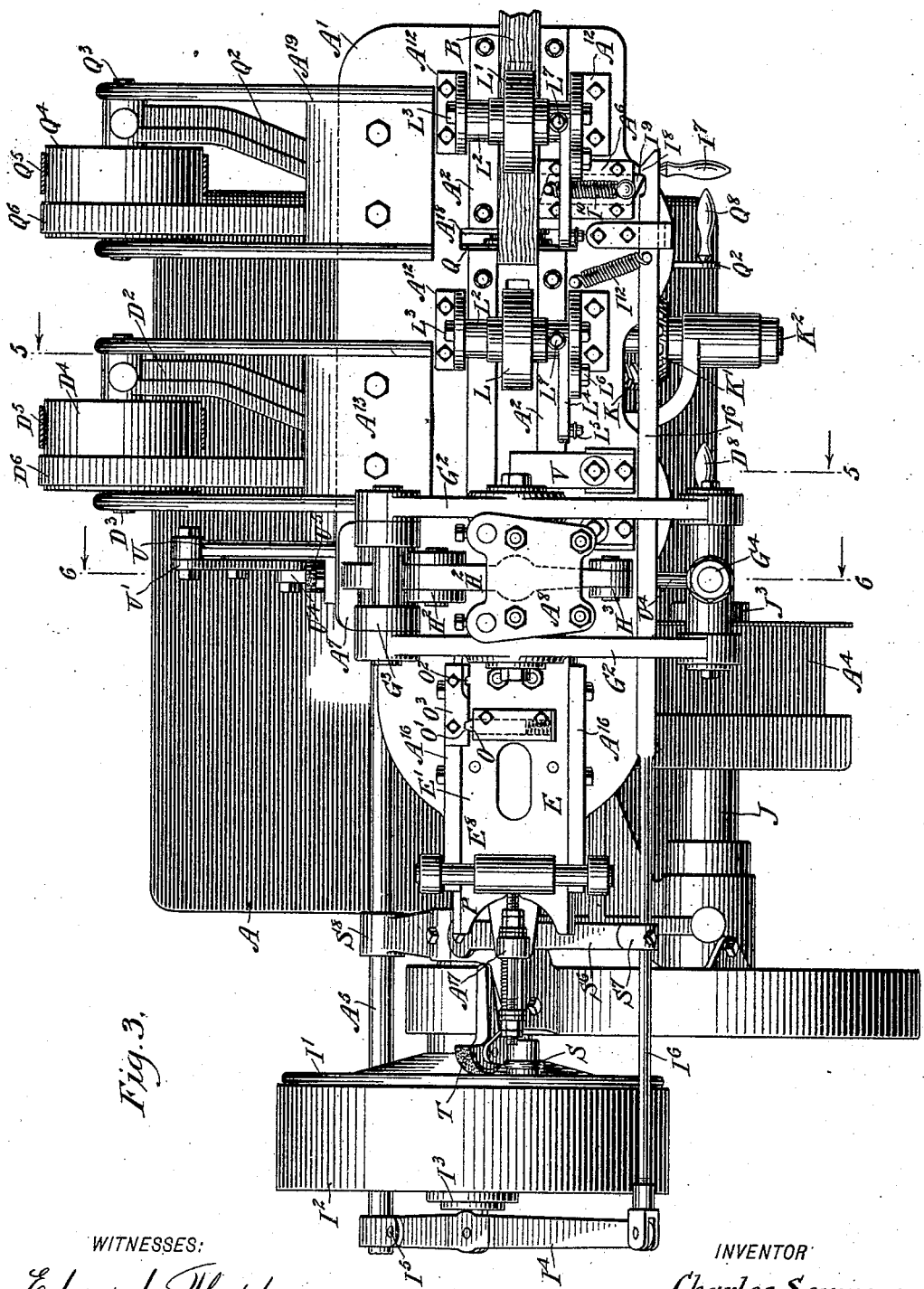
Figure 4:
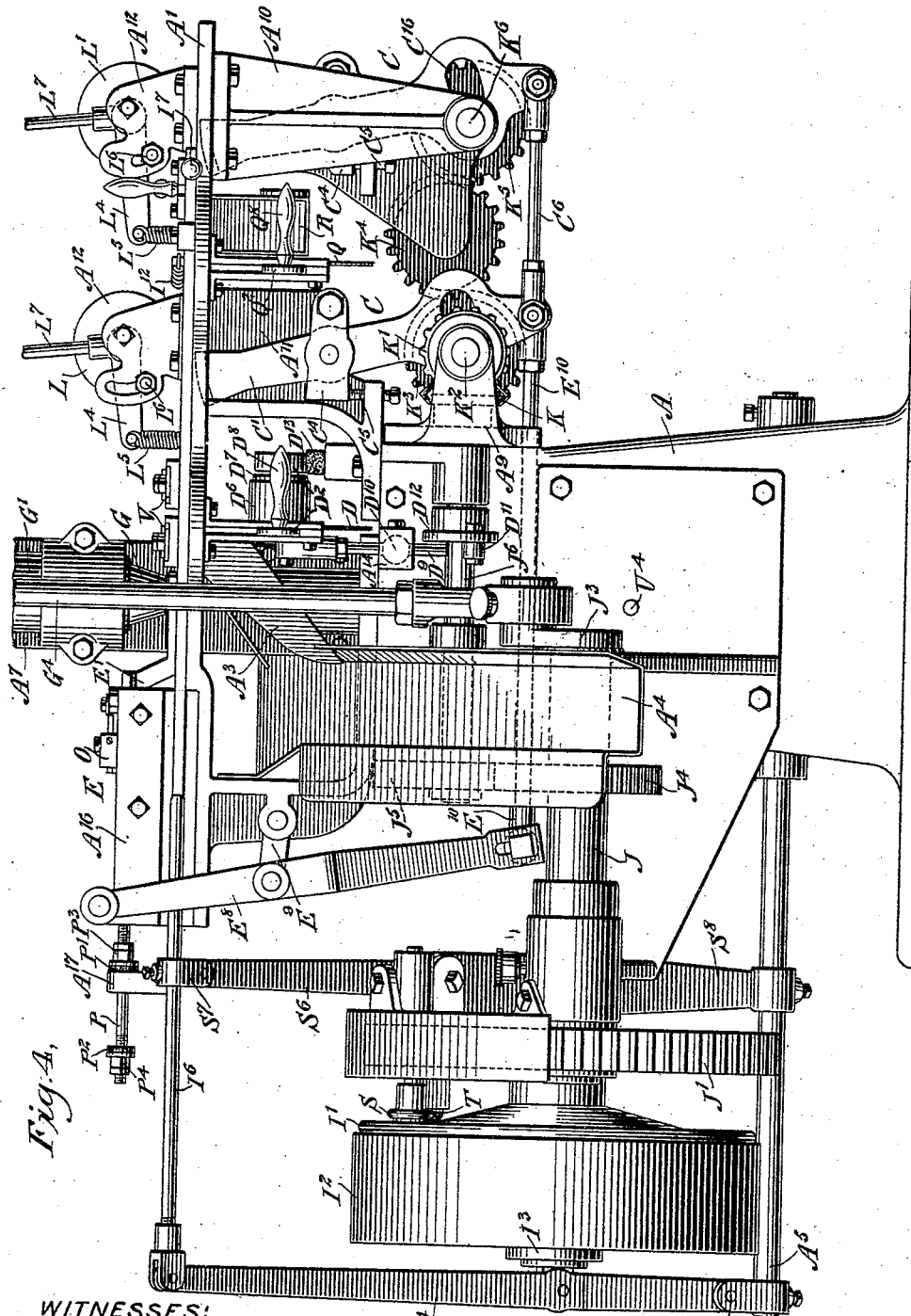
Figure 5:
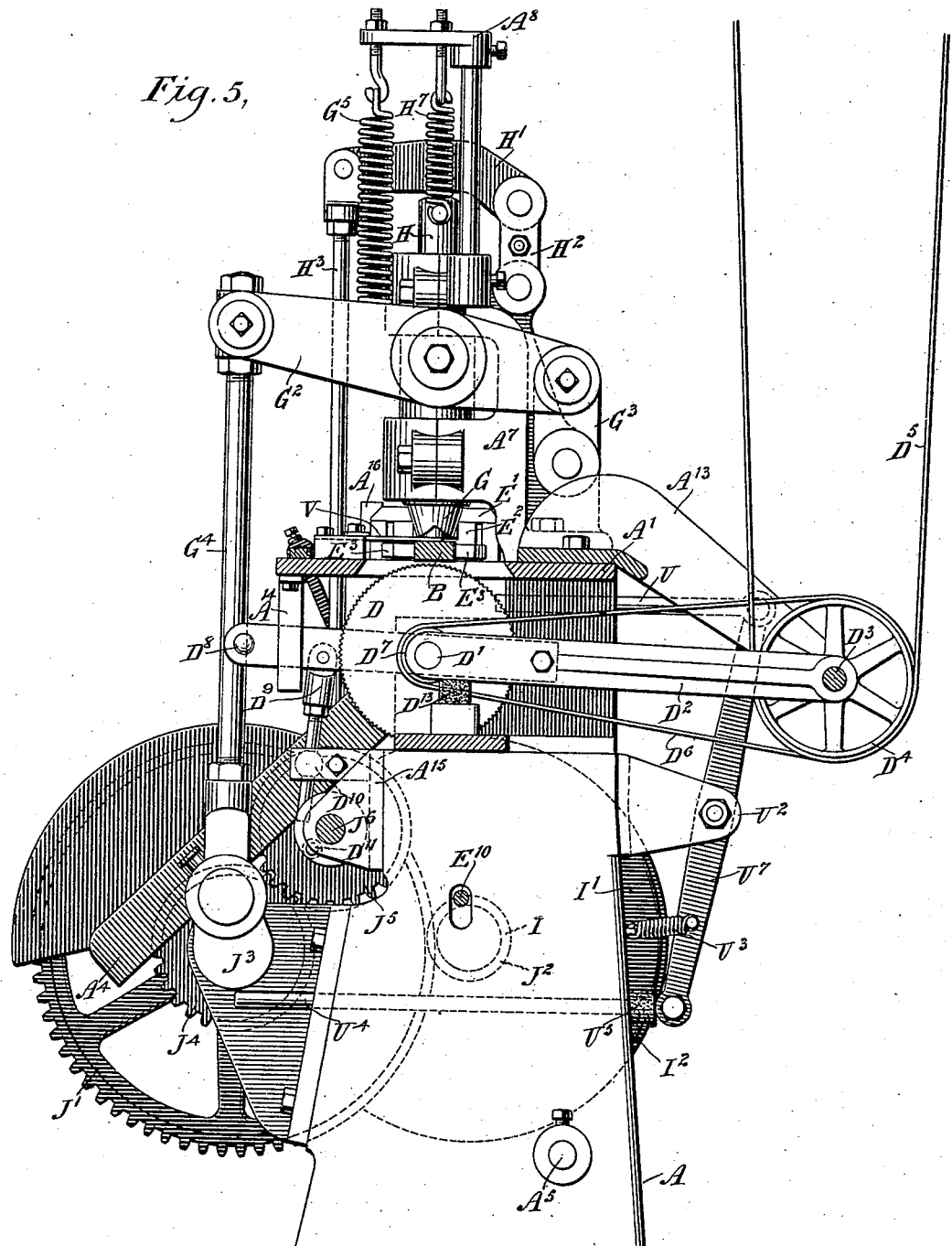
Figure 17:
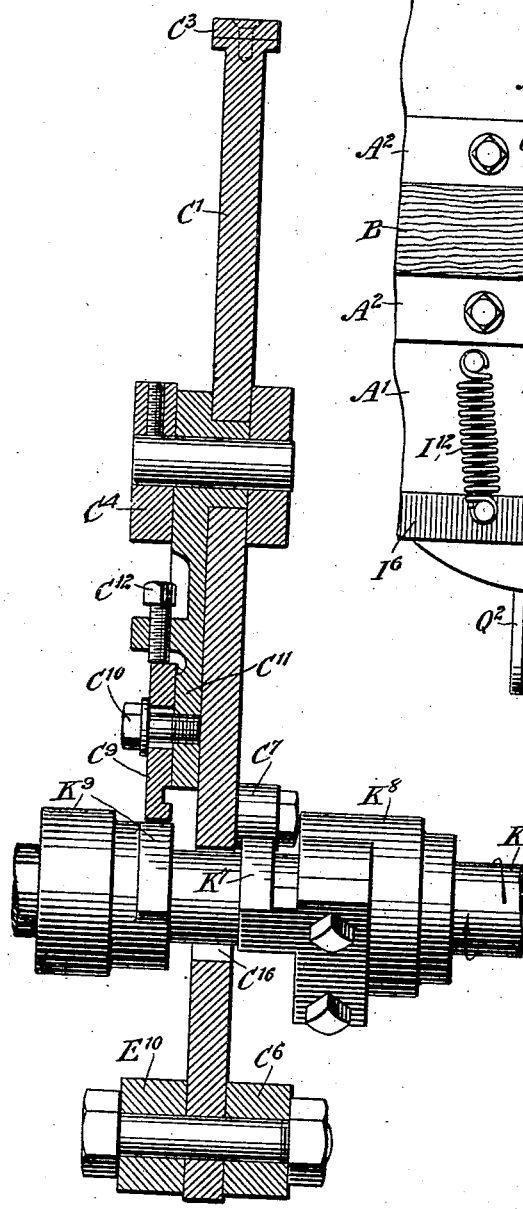
Figure 18:
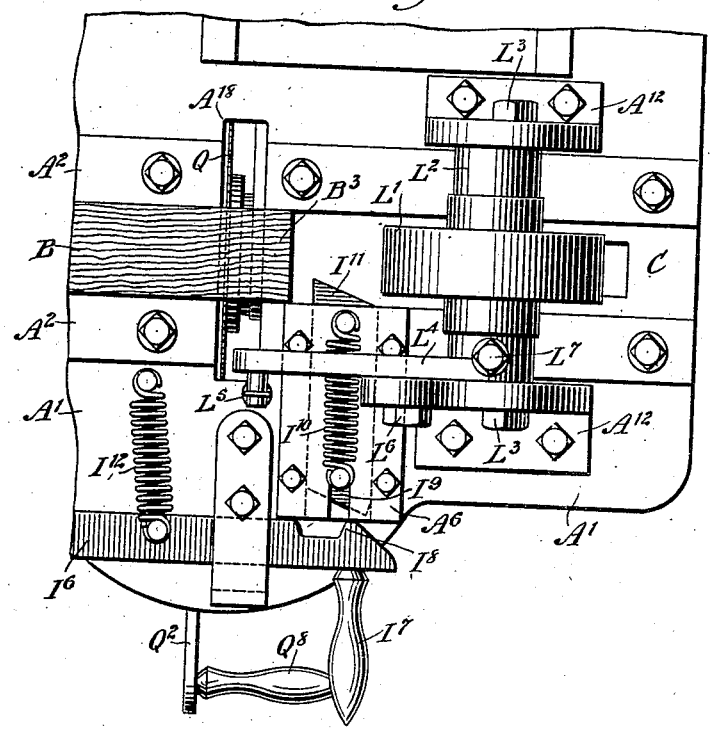
Figure 19:
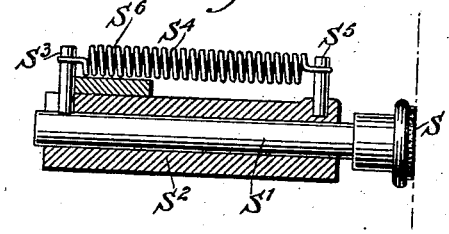
Figure 20:
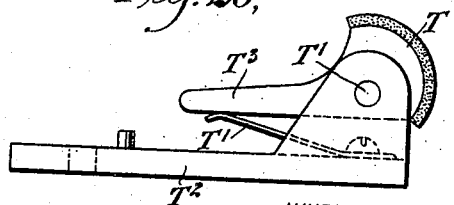

Figure 1 is a front perspective view of the machine. Fig. 2 is a rear perspective view of the same. Fig. 3 is a plan view of the same. Fig. 4 is a side elevation of the same. Fig. 5 is a cross-section of the same on the line 5 5 of Fig. 3. Fig. 6 is a similar view of the same on the line 6 6 of Fig. 3. Fig. 7 is an enlarged transverse section of the combined cutter and die, the ejector, and the anvil or male die. Fig. 8 is an enlarged sectional side elevation of the mechanism for imparting motion to the ejector for ejecting the bung from the combined cutter and die. Fig. 9 is an enlarged rear sectional side elevation of the feed mechanism for the wooden stick. Fig. 10 is a similar view of part of the same, showing one of the feed-arms in feeding position. Fig. 11 is a sectional front elevation of the same, showing the feed-arm in position at the beginning of the feeding period. Fig. 12 is an enlarged plan view, parts being broken out, of the feed mechanism for feeding the square blank to the anvil. Fig. 13 is a like view of the same, showing the parts in position after the square blank is in position on the anvil. Fig. 14 is a plan view of one of the cams for rocking the feed-arms of the blank-feed mechanism. Fig. 15 is an enlarged sectional side elevation of the feed mechanism for feeding the square blank to the anvil, the latter and the combined cutter and die being shown in elevation. Fig. 16 is a perspective view of the cam on a feed-arm of the blank-feed mechanism. Fig. 17 is an enlarged transverse section of the feed mechanism for the stick, the section being on the line 17 17 of Fig. 9. Fig. 18 is an enlarged plan view of part of the feed mechanism for the stick and the mechanism for stopping the machine when the end of the stick is reached. Fig. 19 is an enlarged sectional side elevation of the brake mechanism for the friction-drive. Fig. 20 is an enlarged side elevation of the mechanism for locking the friction-drive against accidental return movement, and Fig. 21 is a perspective view of the bung made by the machine.

Figure 21:
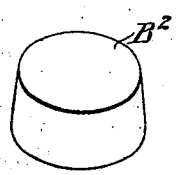

The machine is mounted on a suitably-constructed frame A, provided with a feed-table A′, having longitudinally-extending guideways A² for the passage of a wooden stick or strip B, fed automatically and intermittently forward in the direction of its length by the action of a feed mechanism C, which serves to feed the stick to a circular saw D, employed for successively cutting the stick into approximately square bung-blanks B′, (see Figs. 12 and 15,) each of which is carried by a second feed mechanism E onto an anvil or male die F, (see Fig. 12,) operating in conjunction with a vertically-reciprocating combined cutter and die G to first cut the square blank B′ with a view to form a cylindrical blank and then to compress the cylindrical blank into the complete bung B² of truncated-cone shape, as shown in Figs. 7 and 21. An ejector H is arranged to reciprocate centrally in the combined cutter and die G and serves to force the finished bung B² out of the combined cutter and die G, the discharged bung B² and the cuttings incident to the action of the combined cutter and die G dropping down over chutes A³ and A⁴ to deliver the bung and cuttings to one side of the machine into a suitable receptacle held at the lower end of the chute A⁴.

The feed mechanisms C and E, the means for moving the circular saw D in and out of the path of the stick B, the reciprocating combined cutter and die G, and the ejector H are actuated in unison in order to produce the desired result, and for this purpose the several mechanisms mentioned are driven from a drive-shaft I, extending longitudinally and journaled in suitable bearings arranged on the main frame A. On the drive-shaft I is secured a friction cone-pulley $I'$, adapted to be engaged by a driven pulley $I^2$, mounted to rotate loosely on the driven shaft I and capable of sliding lengthwise thereon, said pulley $I^2$ being connected by belt with other machinery for imparting a rotary motion to the pulley $I^2$. The hub $I^3$ of the pulley $I^2$ is pivotally connected with a lever $I^4$, fulcrumed at $I^5$ on a bracket $A^5$, attached to the main frame A, and the free end of the lever $I^4$ is pivotally connected with a shifter-bar $I^6$, extending over the top of the table $A'$ and provided with a handle $I^7$, adapted to be taken hold of by the operator for moving the shifter-bar $I^6$ in a longitudinal direction. On the shifter-bar $I^6$, adjacent to the handle $I^7$, (see Figs. 3 and 18,) is formed a shoulder $I^8$, adapted to be engaged by the outer end of a handled catch $I^9$, mounted to slide transversely in a suitable bearing $A^6$, attached to the top of the table $A'$. A spring $I^{10}$ is connected with the catch $I^9$ to normally hold the same out of engagement with the shoulder $I^8$, (see Fig. 18,) and the inner end $I^{11}$ of the catch $I^9$ is beveled and projects into the path of the stick B, so that when the latter is introduced in the guideway $A^2$ by the operator then one side of the stick comes in contact with the beveled end $I^{11}$, thus forcing the catch $I^9$ outwardly against the tension of the spring $I^{10}$. When the catch $I^9$ is pressed outward, as described, and the operator pulls the handle $I^7$ from the left to the right, then the shoulder $I^8$ engages the catch $I^9$ to hold the shifter-bar $I^6$ in a right-hand end position against the tension of a spring $I^{12}$, connected with the shifter-bar. When the shifter-bar $I^6$ is moved into a right-hand position by the operator, as described, a swinging motion is given to the lever $I^4$ from the left to the right, so that the driven pulley $I^2$ is moved in frictional engagement with the pulley $I'$ to rotate the latter, and consequently the driven shaft I. When the rear end of the stick B leaves the inner end $I^{11}$ of the catch $I^9$, then the spring $I^{10}$ thereof causes the catch $I^9$ to slide back into its normal position and out of engagement with the shoulder $I^8$, so that the shifter-bar $I^6$ is unlocked and released and forced to move from the right to the left by the action of the spring $I^{12}$, so that the pulley $I^2$ moves out of frictional contact with the pulley $I'$, and consequently the shaft I comes automatically to a stop as soon as the rear end of the stick B has left the end $I^{11}$ of the catch $I^9$.

A longitudinally-extending crank-shaft J is journaled in suitable bearings on the main frame A, and on the said crank-shaft J is secured a gear-wheel $J'$ in mesh with a pinion $J^2$, secured on the driven shaft I, so that when the latter is rotated a rotary motion is given to the crank-shaft J. The crank $J^3$ of the crank-shaft J is connected with the head $G'$, carrying the combined cutter and die G, the said head $G'$ being mounted to slide vertically in suitable bearings carried by a bracket $A^7$, forming part of the main frame A, and the said head $G'$ is pivotally connected at opposite sides with levers $G^2$, fulcrumed at their rear ends on links $G^3$, fulcrumed on the bracket $A^7$. The forward ends of the levers $G^2$ are pivotally connected with a pitman $G^4$, engaging the crank-arm $J^3$ of the crank-shaft J, so that when the latter rotates an up-and-down reciprocating motion is given to the head $G'$, and consequently to the combined cutter and die G. In order to insure an easy reciprocating of the combined cutter and die G and parts connected therewith, it is desirable to counterbalance the same, and for this purpose the head $G'$ is connected with counterbalancing-springs $G^5$, depending from a bracket $A^8$, held vertically adjustable on the bracket $A^7$.

The combined cutter and die G consists, essentially, in an annular cutter $G^6$, having its inner surface cylindrical and its outer surface tapering and its cutting edge in undulating form to produce a shearing cut on the square blank $B'$, the cutting edge having its lowermost points at the front and rear. (See Fig. 15.) The opening of the annular cutter $G^6$ fits the upper end of the anvil F at the time the cutter and die G is in its lowermost position. (See Fig. 7.) The upper end of the cutter $G^6$ terminates in the female die $G^7$, the inner surface of which is tapered inwardly and upwardly from the upper end of the inner surface of the cutter $G^6$, so that the round blank produced by the cutter $G^6$ when forced into the die $G^7$ by the anvil F is compressed and assumes a truncated-cone form, as will be readily understood by reference to Fig. 7. The upward movement of the blank in the die $G^7$ is limited by an annular shoulver $G^8$. It is understood that the anvil F enters and fills the cutter $G^6$ completely on the descent of the combined cutter and die, so that the square blank $B'$ is forcibly pressed by the anvil F into the die $G^6$ and compressed therein. The outer face of the cutter $G^6$ is provided at the front and rear at the lowermost portions with upwardly-extending auxiliary triangular cutters $G^9$, which serve to split or cut the surplus material trimmed by the cutter $G^6$ from the blank $B'$ at transversely opposite points. The exterior surface of the cutter $G^6$ is tapering, so that the surplus material is also split at points longitudinally opposite each other. By this arrangement the surplus material trimmed off the blank B' is practically divided into four parts or corner-pieces, which readily disengage from the exterior surface of the cutter and die and drop into the chute A³.

On the crank-shaft J is secured a gear-wheel J⁴ in mesh with a gear-wheel J⁵, secured on a longitudinally-extending cam-shaft J⁶, journaled in suitable bearings on the frame A, and this cam-shaft J⁶ is connected with the ejector H, mounted to reciprocate centrally in the combined cutter and die G and its head G', the upper end of the ejector being for this purpose connected with a lever H', (see Fig. 6,) pivotally connected at its rear end with links H², fulcrumed on the bracket A⁷, and the front end of the lever H' is pivotally connected with a pitman H³, carrying at its lower end a head H⁴, provided with a friction-roller H⁵, (see Figs. 6 and 8,) adapted to be engaged by a cam H⁶, secured on the cam-shaft J⁶, extending in an opening formed in the head H⁴, so as to guide the latter in its vertical movement. When the shaft J⁶ is rotated, the cam H⁶ acts on the friction-roller H⁵ to move the pitman H³ downward, thereby imparting a downward-swinging motion to the lever H' to move the ejector H downward at the proper time to eject the complete bung B² from the combined cutter and die G. Normally the ejector H is held in an uppermost position, and for this purpose the upper end of the ejector is hung on springs H⁷, attached to the bracket A⁸. By the arrangement described the cam H⁶ imparts a forcible downward movement to the ejector H at the proper time, the return movement of the ejector being accomplished by the springs H⁷.

On the cam-shaft J⁶ is secured a bevel gear-wheel K (see Figs. 4 and 9) in mesh with a bevel gear-wheel K', secured on a transversely-extending cam-shaft K², journaled in suitable bearings formed on brackets A⁹, attached to the main frame A. On the rear end of the shaft K² is secured a gear-wheel K³ in mesh with an intermediate gear-wheel K⁴, journaled on a bracket A¹⁰, depending from the table A', the said intermediate gear-wheel being in mesh with a gear-wheel K⁵, secured on a transverse shaft K⁶, also journaled in the bracket A¹⁰. The shafts K² and K⁶ are adapted to actuate the two feed-arms C' and C², forming part of the feed mechanism C, each feed-arm having its upper end C³ in the form of a toothed segment adapted to pass through slots in the table A' to engage the under side of the stick B. (See Figs. 9 and 10.)

Each of the feed-arms C' and C² is mounted to swing in a longitudinal direction and moves bodily up and down, so as to impart an intermittent forward motion to the stick B. Each feed-arm C' C² is mounted to swing on a link C⁴ as the fulcrum, the links being fulcrumed on the feed-table brackets A¹¹ and A¹⁰, respectively, and the free end of each link C⁴ is adapted to rest on a set-screw C⁵ to limit the downward swinging motion of the corresponding link C⁴. When the link C⁴ rests on the set-screw C⁵, the upper end C³ of the corresponding feed-arm C' C² is a distance below and out of engagement with the under side of the stick B. The lower ends of the feed-arms C' C² are connected with each other by a link C⁶ to cause the feed-arms to swing longitudinally in unison with each other. On the feed-arm C' are journaled friction-rollers C⁷ and C⁸, adapted to be engaged by an arm K⁷, bolted or otherwise secured to a hub K⁸, keyed or otherwise fastened to the shaft K². When the shaft K² is rotated, then the arm K⁷ alternately engages the friction-rollers C⁷ and C⁸, so as to impart an intermittent longitudinal swinging motion to the arm C', and as the latter is connected by the link C⁶ with the feed-arm C² it is evident that the feed-arms C' and C² swing in unison in a longitudinal direction. In order to impart an up-and-down swinging motion to the arms C' and C², each shaft K² and K⁶ is provided with a cam K⁹, adapted to engage a block C⁹, adjustably secured by a bolt C¹⁰ (see Fig. 17) to an arm C¹¹, fulcrumed on the link C⁴, on which the corresponding feed-arm C' or C² is also mounted to swing as its fulcrum, as previously explained. A set-screw C¹² securely locks the block C⁹ against upward movement, it being understood that when the shaft K² or K⁶ is rotated the corresponding cam K⁹, acting on the block C⁹, lifts the latter, and with it the arm C¹¹, which by its connection with the link C⁴ imparts an upward swinging motion to the same to bodily lift the corresponding feed-arms C' and C². This upward movement of the corresponding feed-arms C' and C² takes place at about the time the arm K⁷ engages the friction-roller C⁷, and consequently a simultaneous swinging motion in a longitudinal direction and an upward movement of the arms C' and C² takes place to cause the toothed upper end C³ of each arm to engage the under side of the stick B and to feed the same forward the distance of the length of a bung-blank B'. At the end of the forward stroke of the feed-arms C' and C² the cam K⁹ moves out of engagement with the block C⁹ to allow the corresponding feed-arm C' or C² to drop, and at this time the arm K⁷ engages the other friction-roller C⁸ to impart a return swinging motion to the feed-arms at the time the upper segmental and toothed ends C³ are out of engagement with the under side of the stick B.

The arms C¹¹ for the feed-arms C' C² have a limited swinging motion relative to their feed-arms, the movement being limited by stop-pins C¹³ and C¹⁴, secured on the feed-arms C' C², each arm C¹¹ resting normally against the stop-pin C¹³ (see Fig. 9) by the action of a spring C¹⁵, attached to the arm $C^{11}$ and resting on the stop-pin $C^{14}$. By this arrangement an undue binding of the cam $K^9$ on the lower end of the block $C^9$ is prevented, as the arm $C^{11}$ is free to swing away from the stop-pin $C^{13}$ at the time the cam $K^9$ moves in contact with the block $C^9$, thus allowing the cam to easily engage and gradually lift the block $C^9$ to bring the end $C^3$ in gradual engagement with the stick B. Each of the feed-arms $C'$ $C^2$ is provided at its lower end with an elongated segmental slot $C^{16}$, through which extends loosely the corresponding shaft $K^2$ or $K^6$.

The upper surface of the stick B is in engagement with the peripheral surfaces of resistance-rollers L and L' at points directly above the ends $C^3$ of the feed-arms $C'$ and $C^2$, as plainly shown in Fig. 9, and each of the said resistance-rollers has its shaft $L^2$ hung eccentrically on centers $L^3$, carried by brackets $A^{12}$, attached to the feed-table A'. Each of the shafts $L^2$ is provided with a horizontally-extending arm $L^4$, connected at its free end with a spring $L^5$, attached to the feed-table A'. By the arrangement described each resistance-roller L is allowed to yield in an upward direction against the tension of the springs $L^5$, so that when the ends $C^3$ of the feed-arms $C'$ $C^2$ come in contact with the under side of the stick B then the latter is forced in firm contact with the peripheral surfaces of the resistance-rollers L L', capable of yielding in an upward direction, so that a proper and accurate forward feeding of the stick B takes place without danger of injury to any of the parts of the feed mechanism. The downward swinging motion of each arm $L^4$ is limited by a stop-pin $L^6$, adjustably secured in a segmental slot formed in one of the brackets $A^{12}$, as plainly shown in Fig. 4. Each of the shafts $L^2$ is also provided with an upwardly-extending handle $L^7$, adapted to be taken hold of by the operator to swing the resistance-roller L or L' upwardly whenever it is desired to do so.

The circular saw D is continually rotated and is moved in and out of the path of the stick B, and for this purpose the following arrangement is made: The arbor D' of the saw D is journaled in a forked arm $D^2$, fulcrumed on a shaft $D^3$, journaled in suitable bearings carried by a bracket $A^{13}$, (see Figs. 3 and 5,) attached to the table A' and extending rearwardly therefrom. On the shaft $D^3$ is secured a pulley $D^4$, over which passes a belt $D^5$, connected with other machinery for imparting a continuous rotary motion to the pulley $D^4$, the latter being sufficiently wide at its rim to accommodate a second belt $D^6$, which passes over a pulley $D^7$, secured on the arbor D' of the circular saw D. One of the members of the forked arm $D^2$ is extended forwardly and carries at its forward end a handle $D^8$, adapted to be taken hold of by the operator to swing the arm $D^2$ up or down whenever it is desired to do so, the free end of the said arm member being guided in a suitable guideway $A^{14}$, depending from the table A'. In order to impart an automatic upward swinging motion to the arm $D^2$, and consequently to the circular saw D, an arm $D^9$ is pivotally connected with the extended member of the arm $D^2$, and this arm $D^9$ is mounted to slide centrally through a ball-bearing $D^{10}$, mounted in a bracket $A^{15}$, attached to the main frame A. (See Figs. 4 and 5.) The lower end of the arm $D^9$ is adapted to be engaged by a friction-roller $D^{11}$ on a crank-disk $D^{12}$, secured on the cam-shaft $J^6$, so that when the machine is started, as previously explained, and the shaft $J^6$ is rotated then the friction-roller $D^{11}$ periodically engages the lower end of the arm $D^9$ to lift the same, and thereby impart a swinging motion to the arm $D^2$ to move the circular saw D upwardly through a slot $A^{16}$, formed in the table A' for the cutting-teeth of the saw D to engage and cut the stick B, with a view to form the square blank B'. When the friction-roller $D^{11}$ leaves the lower end of the arm $D^9$, then the arm $D^2$ by its own weight swings down into a lowermost position, thus moving the circular saw D out of engagement with the stick B into the position shown in Fig. 5. The downward swinging motion of the arm $D^2$ is limited by a suitable cushion $D^{13}$, of felt or other material, held on the main frame A. (See Fig. 5.) The friction-roller $D^{11}$ is so arranged relative to its arm $D^9$ and to the feed mechanism C, that the saw D is lifted and cuts off the blank B' at the time the feed-arms $C'$ and $C^2$ are on their return stroke and are out of engagement with the stick B, so that the latter is dormant for the time being and the saw D can readily cut the stick while at rest.

The feed mechanism E (see Figs. 3, 4, 12, 13, 14, 15, and 16) is arranged as follows: A cross-head E' is mounted to slide longitudinally in suitable bearings $A^{16}$, attached to the rear end of the table A', and on the said cross-head E' are fulcrumed horizontally-swinging arms $E^2$, provided at their forward ends with L-shaped clamps $E^3$ for engaging the rear corners of the square blank B', as plainly illustrated in Figs. 12 and 13. On the arms $E^2$ are also secured inwardly-extending pins $E^4$ for engaging the front and rear sides of the blank B' near the front corners thereof, and hence when the said clamps $E^3$ and the pins $E^4$ engage the blank B' as described and shown in Fig. 12, and a reciprocating motion in a forward direction is given to the cross-head E' then the blank B' is carried from its cut-off position at the saw D onto the top of the anvil F, as shown in Fig. 13, the movement of the cross-head E' in the direction indicated being regulated to practically center the blank B' on the anvil F. The ends of the pivoted arms $E^2$ are pressed apart by a spring $E^5$ to hold the clamps $E^3$ and the pins $E^4$ in proper engagement with the blank $B'$, as above described, the closing movement of the arms being limited by stops $E^6$, engaging the rear ends of the arms $E^2$ and secured to the table $A'$. In order to open and close the arms $E^2$ at the proper time, the arms are provided at their rear ends with depending almond-shaped cams $E^7$, adapted to engage cams $N$, held on arms $N'$, fulcrumed at their rear ends at $N^2$ on the top of the table $A'$. The arms $N'$ are pressed apart by a spring $N^3$, and their outward swinging motion is limited by stops $N^4$, rising from the table $A'$. When the several parts are in the position as shown in Fig. 12 and the cross-head $E'$ is moved rearwardly for the arms $E^2$ to carry the blank $B'$ from the cut-off position onto the anvil $F$, then the cams $E^7$ in passing over the cams $N$ cause the arms $N'$ to slide toward each other without causing the arms $E^2$ to change their position. When the cross-head $E'$ moves forwardly, then the cams $E^7$ engage the inner faces of the cams $N$, and in doing so a swinging motion is given to the arms $E^2$ to open the same, as a further outward swinging motion of the arms $N'$ is prevented by the stops $N^4$. During the forward travel of the cross-head $E'$ the arms $E^2$ are open, and when the cams $E^7$ finally leave the cams $N$ then the spring $E^5$ closes the arms $E^2$, so that the transverse members of the L-shaped clamps $E^3$ pass into the kerf made by the saw in cutting off the piece $B'$, and consequently the clamps $E^3$ engage the corners of the blank $B'$, as shown in Fig. 12. It is understood that when the cross-head $E'$ moves from the right to the left the arms $E^2$ are held against swinging by their stops $E^6$, while the arms $N'$ swing inwardly toward each other against the tension of the spring $N^3$; but when the cross-head $E'$ moves from the left to the right then the arms $N'$ are held against swinging by their stops $N^4$, while the arms $E^2$ are caused to swing to open for the purpose above mentioned.

The cross-head $E'$ receives its reciprocating motion from the feed mechanism $C$, so as to operate in unison with the same, and for this purpose the cross-head $E'$ is pivotally connected with a lever $E^8$, fulcrumed on a link $E^9$, fulcrumed on the main frame $A$, and the lever $E^8$ is pivotally connected by a link $E^{10}$ (see Fig. 4) with the lower end of the feed-arm $C'$, so that when the latter receives a swinging motion, as previously explained, then a like motion is given to the lever $E^8$, and consequently a reciprocating motion is given to the cross-head $E'$. Thus when the feed-arms $C'$ and $C^2$ swing with their upper ends from the right to the left to feed the stick $B$ forward then at the same time the cross-head $E'$ moves in a like direction, and its arms $E^2$ carry the previously-cut-off blank $B'$ to the anvil $F$, and when the arms $C'$ and $C^2$ are at the return stroke then the cross-head $E'$ is also at the return stroke to engage its clamps $E^3$ and pins $E^4$ with the next blank $B'$.

In order to insure an accurate movement of the cross-head $E'$ and to hold the same against accidental movement in either of its end positions, a spring-latch $O$ is provided, mounted on the top of the cross-head $E'$ (see Fig. 3) and adapted to engage alternately notches $O'$ $O^2$, cut in a plate $O^3$, bolted to one of the guideways $A^{16}$.

In order to cause the cross-head $E'$ to reach its end position in either direction without shock or jar, a bumping device is provided, arranged as follows: From the rear end of the cross-head $E'$ depends longitudinally a rod $P$, passing through a bumping-block $A^{17}$, attached to the frame $A$, and on the said rod $P$ on opposite sides of the bumping-block $A^{17}$ are held washers $P'$ and $P^2$, of rubber or similar material, and resting against adjusting-nuts $P^3$ and $P^4$, screwing on the threaded portions of the rod $P$. When the cross-head $E'$ moves from the right to the left, the washers $P'$ move in contact with the inner face of the bumping-block $A^{17}$ at the time the cross-head $E'$ moves into its end position, (see Fig. 13,) and in a like manner when the cross-head $E'$ moves from the left to the right then the washer $P^2$ moves in engagement with the outer face of the bumping-block $A^{17}$ at the time the cross-head $E'$ leaves its forward end position.

The rear end $B^3$ of the stick $B$ (see Fig. 18) is usually not fit for forming a bung, and in order to cut this undesirable end $B^3$ off at a point which is a distance from the saw $D$ corresponding to the aggregate length of blanks $B'$ the following arrangement is made: A circular saw $Q$ is located below the table $A'$ between the feed-arms $C'$ and $C^2$, and the said saw $Q$ is adapted to be lifted to extend through a slot $A^{18}$ in the feed-table $A'$ (see Fig. 9) to cut the rear end $B^3$ off the stick $B$ at a point to leave the stick extending between the saws $D$ and $Q$ of a length for the saw $D$ to cut a number of properly-sized lengths $B'$ without leaving a remnant. The circular saw $Q$ has its arbor $Q'$ mounted in a transversely-extending lever $Q^2$, fulcrumed on a shaft $Q^3$, mounted to turn in a bracket $A^{19}$, bolted to the table $A'$. On the shaft $Q^3$ is secured a pulley $Q^4$, connected by a belt $Q^5$ with other machinery for imparting a rotary motion to the pulley $Q^4$, which latter is of sufficient width to accommodate another belt $Q^6$, passing over a pulley $Q^7$, (see Fig. 9,) attached to the arbor $Q'$ of the circular saw $Q$. The lever $Q^2$ is extended forwardly, and the extended end is guided in a vertically-disposed guideway $A^{20}$, bolted to the under side of the table $A'$, and on the said extended end of the lever $Q^2$ is secured a handle $Q^8$, adapted to be taken hold of by the operator for imparting an upward-swinging motion to the lever Q², with a view to bring the continually-rotating circular saw Q in engagement with the stick B to cut off the undesirable end B³. When this is done, the operator swings the lever Q² downward to move the top of the saw Q again out of the guideway A² and out of the path of the next stick B. The guideway A²⁰ forms a rest for the lever Q² to hold the latter in its lowermost position. It is understood that when the end B³ of the stick B passes the catch I⁹ and the latter is moved out of engagement with the shifter-bar I⁶, as previously explained, then the machine comes to a stop, and when this takes place the operator swings the lever Q² upward, so that the saw Q cuts off the undesirable end B³, which latter drops into a chute R, (see Fig. 4,) which carries the undesirable end to one side of the machine.

In order to bring the machine to a quick stop at the time the shifter-bar I⁶ is moved from the right to the left, a friction stopping device is provided (shown in detail in Fig. 19) and consists of a friction-disk S, held on a rod S′, mounted to slide in a bearing S² and carrying at its outer end a pin S³, connected with one end of a spring S⁴, attached at its other end to a pin S⁵, secured to the bearing S². A lever S⁶ is adapted to engage the pin S³, and this lever is pivotally connected with a collar S⁷, adjustably secured to the shifter-bar I⁶, (see Figs. 1, 2, 3, and 4,) the lower end of the lever S⁶ being fulcrumed on a bracket S⁸, attached to the bracket A⁵, and also carrying the bearing S², above mentioned. When the shifter-bar I⁶ is moved from the left to the right, Fig. 1, then a swinging motion is given to the lever S⁶ by the said shifter-rod to move the rod S′ and the friction-disk S from the left to the right, at the same time compressing the spring S⁴. The friction-disk S now is out of contact with the face of the friction cone-pulley I′; but when the shifter-bar I⁶ is moved from the right to the left and the pulley I² is moved out of frictional engagement with the pulley I′ then the lever S⁶ in swinging from the right to the left allows the spring S⁴ to act on the rod S′ to shift the same from the right to the left, thereby moving the friction-disk S in firm contact with the friction cone-pulley I′ to brake the same, and thereby bring the cone-pulley and connected parts quickly to a standstill.

In order to prevent accidental turning of the friction cone-pulley I′ in a reverse direction, the following device is provided, special reference being had to Figs. 3 and 20. A segmental arm T is eccentrically mounted at T′ on a bracket T², attached to or forming part of the bracket S⁸, and the extension-arm T³ of the segmental arm T is pressed on by a spring T⁴ to engage the peripheral surface of the arm T with the face of the friction cone-pulley I′. As long as this pulley I′ rotates in the right direction then the arm T remains inactive; but in case the friction cone-pulley I′ is turned in a reverse direction then the eccentric rim of the arm T firmly engages the face of the pulley I′ with a view to lock the same, and thereby prevent the pulley from rotating in the wrong direction.

In order to prevent the finished bung and the cuttings incident to the action of the combined cutter and die G from accumulating on the socket F′, in which the anvil F is adjustably secured, the following device is provided: A rod U is mounted to slide transversely in the main frame A, (see Figs. 2, 3, and 6,) and the rear end of this rod U is pivotally connected with a lever U′, fulcrumed on a bracket U², secured to the frame A. A spring U³ is connected with the lever U′ to hold the rod U normally in a withdrawn position, as shown in Fig. 6, and the lower end of the lever U′ is pivotally connected with a rod U⁴, extending transversely and mounted to slide in suitable bearings in the frame A. The forward end of the rod U⁴ is adapted to be engaged by the lower head of the pitman G⁴, so that when the machine is in operation and the crank-shaft J is rotated then the pitman G⁴ at each revolution strikes the forward end of the rod U⁴ and pushes the same rearwardly to impart a swinging motion to the lever U′, so that the rod U slides forwardly and over the top of the socket F′, so as to push any accumulated matter thereon off the socket and into the chute A³. As soon as the pitman G⁴ leaves the rod U⁴ the several parts are returned to their normal position by the action of the spring U³. In order to prevent undesirable shock during this return movement of the lever U′ and connected parts, a cushion U⁵ is provided, held on the rod U⁴ adjacent to the lower end of the lever U′ and adapted to abut against the frame A.

In order to prevent the forward end of the stick B from moving upward out of the guideway A² at the same time the saw D is moving upward to cut off the blank B′, I provide retaining-plates V, adjustably secured to the top of the table A′ and extending transversely across the top of the bearing A² on opposite sides of the saw D, so as to prevent the stick B from rising at the time the saw D cuts off the blank B′.

The operation is as follows: In introducing the stick B the operator by manipulating the handles L⁷ slightly raises the resistance-rollers L L′ to permit of conveniently pushing the stick B along in the guideway A² until the forward end of the stick is in vertical alinement with the circular saw D, which may be raised by the operator manipulating the handle D⁸ to bring the saw into the guideway A² for the end of the stick B to abut against, and thus bring the end in proper alinement with the saw. After the stick B is introduced then the saw D is lowered and likewise the resistance-rollers L L', and then the operator using the handle I⁷ pulls the shifter-bar I⁶ to the right to start the machine, as previously explained, the spring-catch I⁹ locking the shifter-bar I⁶ against return movement by engaging the shoulder I⁸. As previously explained, the feed mechanism C by the action of its arms C' C² now feeds the stick B forward a distance corresponding to the length of a square blank B', and as soon as the feeding stops then the circular saw D rises and cuts off the blank B', when the clamps E³ and pins E⁴ engage the cut-off blank B', moving the same forward onto the top of the anvil F and holding it thereon. The combined cutter and die G now descends, and the cutter G⁶ thereof cuts or trims the square blank to form a round blank, which on the further descent of the combination cutter and die G is forced into the female die G⁷ of the said combined cutter and die and is thereby compressed into a bung B² of truncated-cone shape. The combined cutter and die G now rises, while the ejector H descends and pushes the bung B² out of the combined cutter and die. During the time the feed mechanism E moves the blanks B' over onto the anvil F the stick B is fed forward and another square blank B' is cut off from the end of the stick by the action of the saw D at the time the feed-arms C', C², and E² are on the return stroke. The clamp E³ and pins E⁴ now engage the new square blank and transfer it to the anvil F, the square blank pushing the bung B² off the anvil F, so that the latter falls into the chute A³ to finally pass to one side of the machine by way of the chute A⁴.

The above-described operation is automatically repeated until the rear end B³ of the stick B has passed the inner end I¹¹ of the catch I⁹, (see Fig. 18,) and when this takes place the spring I¹⁰ withdraws the catch I⁹ from the shoulder I⁸, so that the shifter-bar I⁶ is released and is moved to the left by the action of its spring I¹². The machine is now stopped—that is, further feeding of the stick B ceases. The operator now takes hold of the handle Q⁸ and swings the lever Q² upward, so that the saw Q cuts off the end B³, which latter then drops into the chute R and is delivered to one side of the machine. When this has been done, the saw Q is returned to its lowered inactive position, and then another stick B is placed into the guideway A' and pushed forward under the resistance-roller L' until the forward end of this newly-introduced stick abuts against the rear end of the stick B, extending between the saws Q and D. Now when this second stick is introduced as described the catch I⁹ is pressed outward by the stick and then the operator pulls the shifter-bar I⁶ to the right to restart the machine, it being understood that the two sticks now in the guideway A² are both simultaneously fed forward and the above-described operation is repeated—that is, blanks are cut off and formed into bungs from the first stick introduced into the machine, until this first stick is completely cut up, and the second stick is treated likewise to form blanks B', as above explained. It is understood that the distance between the saws D and Q corresponds to the aggregate length of several square blanks B', so that each stick when cut up into blanks leaves no remnant, and consequently it is possible to use stick after stick without requiring resetting of the machine.

Having thus described my invention, I claim as new and desire to secure by Letters Patent—

1. A machine for making compressed bungs from a wooden stick, provided with an intermittent feed mechanism for the said stick and comprising a feed-table, a roller engaging one face of the said stick, a feed-arm for engaging the other face of the said stick approximately opposite the said roller, a link in which the said feed-arm is fulcrumed, a revoluble shaft, an arm on the said shaft engaging friction-rollers on the said feed-arm for imparting a longitudinal rocking motion to the said feed-arm, a cam on the said shaft engaging a fixed part on the said feed-arm, means for cutting the stick into square blanks, and means for forming the blanks into bungs.

2. A machine for making compressed bungs from a wooden stick, provided with an intermittent feed mechanism for the said stick and comprising a feed-table, a roller engaging one face of the said stick, a feed-arm for engaging the other face of the said stick approximately opposite the said roller, a link in which the said feed-arm is fulcrumed, a revoluble shaft, an arm on the said shaft engaging friction-rollers on the said feed-arm, for imparting a longitudinal rocking motion to the said feed-arm, a cam on the said shaft engaging a fixed part on the said feed-arm, the said fixed part being adjustably secured on the feed-arm, means for cutting the stick into square blanks, and means for forming the blanks into bungs.

3. A machine for making compressed bungs, provided with a combined cutting and compressing device, a feed mechanism for carrying a square blank to the said cutting and compressing device and comprising a reciprocating cross-head, spring-pressed arms fulcrumed thereon having angular clamping members for engaging opposite corners of the square blank, and spring-pressed cam-levers having cams engaging cams on the said arms to open the latter for releasing the blank, to keep the arms open during return movement, and to allow the arms to close for its clamping members to engage another square blank.

4. A machine for making compressed bungs from a stick of wood, provided with a feed mechanism for feeding the stick intermittently forward, the feed mechanism comprising a feed-arm, a pivoted link on which the feed-arm is fulcrumed, friction-rollers on the said feed-arm, a revoluble shaft carrying an arm for alternately engaging the said feed-arm, a spring-pressed lifting-arm fulcrumed on the said link, stop-pins on the feed-arm and between which oscillates the said lifting-arm, a cam on the said shaft for engaging the said lifting-arm to raise the latter, means for cutting the stick into square blanks, and means for forming the blanks into bungs.

5. A bung-making machine, comprising an anvil and a combined die and cutter coöperating therewith, means for cutting a strip of wood into square blanks, means for feeding the blanks onto the anvil, said means comprising a cross-head, means for reciprocating the cross-head, arms pivoted to the cross-head and projecting therebeyond, a spring normally pressing the arms toward each other, fingers on the arms for engaging the rear faces of the blanks, spring-pressed pins for engaging the sides of the blanks, means for opening the arms during the movement of the cross-head from the anvil, and a spring-pressed catch on the cross-head for locking the same when the block is centered on the anvil.

6. A bung-making machine, comprising an anvil and a combined die and cutter coöperating therewith, means for cutting a strip of wood into square blanks, means for feeding the blanks onto the anvil, comprising a cross-head, means for reciprocating the cross-head, arms pivoted to the cross-head and projecting therebeyond, a spring normally pressing the arms toward each other, fingers on the arms for engaging the rear faces of the blanks, means for opening the arms during the movement of the cross-head from the anvil, and a spring-pressed catch on the cross-head for locking the same at each end of its reciprocation.

7. A bung-making machine, comprising an anvil and a combined die and cutter coöperating therewith, and means for feeding blanks onto the anvil, comprising a cross-head, means for reciprocating the cross-head, arms pivoted to the cross-head and projecting therebeyond, a spring normally pressing the arms toward each other, fingers on the arms for engaging the rear faces of the blanks, means for opening the arms during the movement of the cross-head from the anvil, and a spring-pressed catch on the cross-head for locking the same when the block is centered on the anvil.

8. A bung-making machine, comprising an anvil and a combined die and cutter coöperating therewith, means for feeding blanks onto the anvil, comprising a pair of reciprocating arms normally spring-pressed toward each other, fingers on the arms for engaging the rear faces of the blanks, spring-pressed pins for engaging the sides of the blanks, means for opening the arms during their movement from the anvil, and a spring-pressed catch in connection with the arms for locking them when the block is centered on the anvil.

9. A bung-making machine, comprising an anvil and a combined die and cutter coöperating therewith, and means for feeding blanks onto the anvil, comprising a pair of reciprocating arms normally spring-pressed toward each other, fingers on the arms for engaging the rear faces of the blanks, means for opening the arms during their movement from the anvil, and a spring-pressed catch in connection with the arms for locking them at each end of their reciprocation.

In testimony whereof I have signed my name to this specification in the presence of two subscribing witnesses.

CHARLES SEYMOUR.

Witnesses:
K. Sharpe,
Jos. Bauer.